US009710706B2

United States Patent
Francois et al.

(10) Patent No.: US 9,710,706 B2
(45) Date of Patent: Jul. 18, 2017

(54) METHOD FOR CLASSIFYING A KNOWN OBJECT IN A FIELD OF VIEW OF A CAMERA

(71) Applicant: GM GLOBAL TECHNOLOGY OPERATIONS LLC, Detroit, MI (US)

(72) Inventors: Stephane Francois, Nepean (CA); James W. Wells, Rochester Hills, MI (US); Neil David McKay, Chelsea, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 402 days.

(21) Appl. No.: 14/493,951

(22) Filed: Sep. 23, 2014

(65) Prior Publication Data

US 2016/0086028 A1 Mar. 24, 2016

(51) Int. Cl.
*G06K 9/00* (2006.01)
*G06K 9/62* (2006.01)
(Continued)

(52) U.S. Cl.
CPC ..... *G06K 9/00536* (2013.01); *G06K 9/00201* (2013.01); *G06K 9/00718* (2013.01); *G06K 9/00771* (2013.01); *G06K 9/3208* (2013.01); *G06K 9/6269* (2013.01); *G06T 7/74* (2017.01); *G06T 17/10* (2013.01); *G06T 19/20* (2013.01); *H04N 13/021* (2013.01);
(Continued)

(58) Field of Classification Search
CPC ........... G06K 9/00536; H04N 13/0217; H04N 13/021; G06T 19/20
USPC .......................................................... 348/46
See application file for complete search history.

(56) References Cited

U.S. PATENT DOCUMENTS

| 8,780,110 | B2 | 7/2014 | Ben Himane et al. |
| 2004/0070582 | A1* | 4/2004 | Smith ................... A61B 8/4254 |
| | | | 345/419 |
| 2013/0226532 | A1* | 8/2013 | Ben Himane ............ G06K 9/46 |
| | | | 703/1 |

FOREIGN PATENT DOCUMENTS

WO 2014015889 A1 1/2014

OTHER PUBLICATIONS

Langer, M. [et al.]: An Interactive Vision-based 3D Reconstruction Workflow for Industrial AR Applications. In: 9th IEEE and ACM International Symposium on Mixed and Augmented Reality (ISMAR'10): Workshop: Augmented Reality Super Models. 2010; im Internet am Mar. 4, 2011 verfugbar unter der URL http://www.icg.tu-graz.ac.at/Members/arth/supermodels/03_langer.pdf, abgerufen am Jul. 13, 2015.

(Continued)

*Primary Examiner* — Nguyen Truong
(74) *Attorney, Agent, or Firm* — Quinn IP Law

(57) ABSTRACT

A method for classifying a known object in a field of view of a digital camera includes developing a plurality of classifier feature vectors, each classifier feature vector associated with one of a plurality of facet viewing angles of the known object. The digital camera captures an image in a field of view including the known object and an image feature vector is generated based upon said captured image. The image feature vector is compared with each of the plurality of classifier feature vectors and one of the plurality of classifier feature vectors that most closely corresponds to the image feature vector is selected. A pose of the known object relative to the digital camera is determined based upon the selected classifier feature vector.

15 Claims, 3 Drawing Sheets

(51) Int. Cl.
G06T 17/10 (2006.01)
G06T 19/20 (2011.01)
H04N 13/02 (2006.01)
G06K 9/32 (2006.01)
G06T 7/73 (2017.01)

(52) U.S. Cl.
CPC ..... *H04N 13/0217* (2013.01); *H04N 13/0275* (2013.01); *G06K 9/6267* (2013.01)

(56) References Cited

OTHER PUBLICATIONS

Southey, T.: Improving Object Detection using 3D Spatial Relationships. PhD Thesis, University of British Columbia, Vancouver (2013).

* cited by examiner

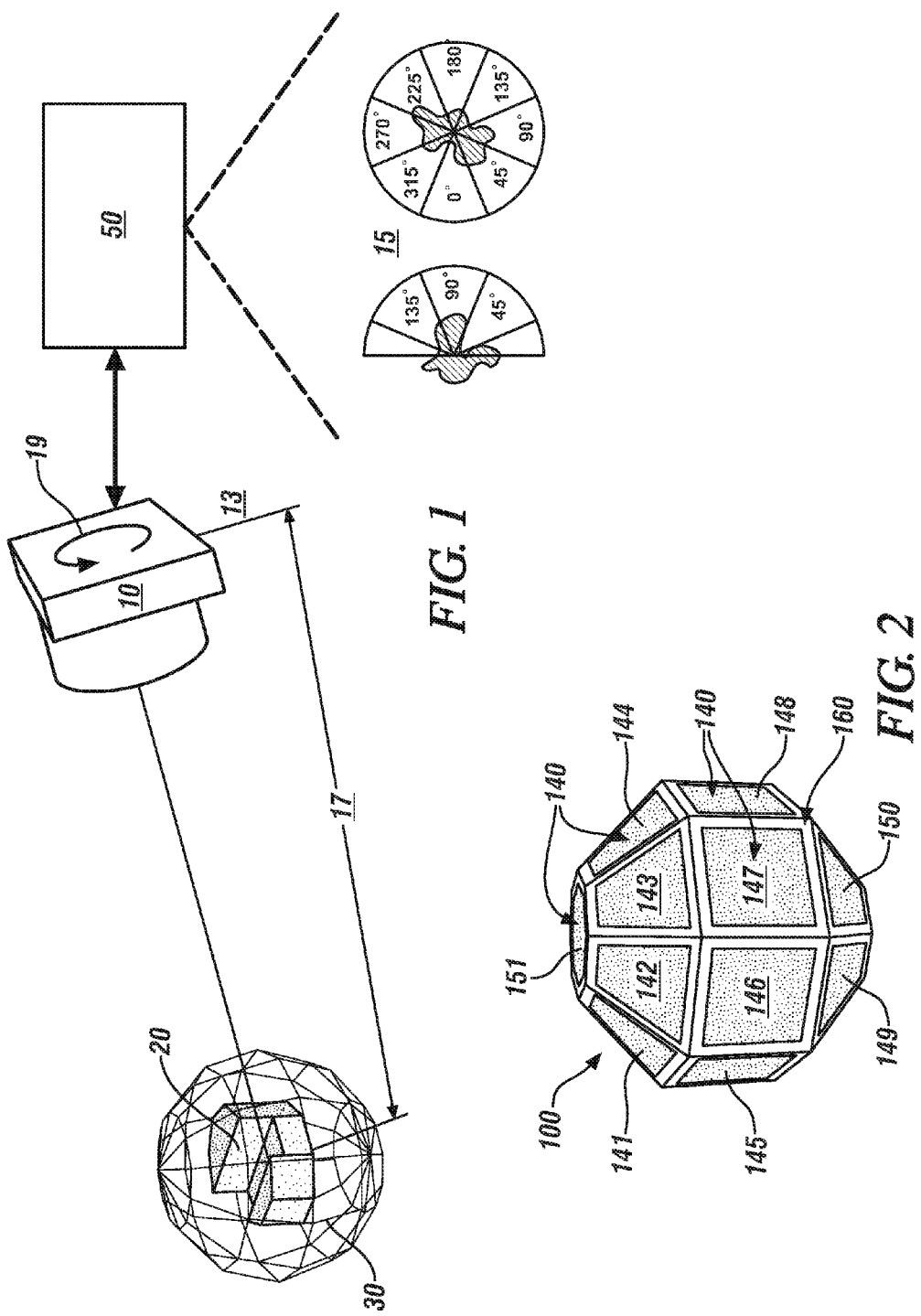

METHOD FOR CLASSIFYING A KNOWN OBJECT IN A FIELD OF VIEW OF A CAMERA

TECHNICAL FIELD

This disclosure relates to imaging systems, and a method for classifying objects in a field of view.

BACKGROUND

The statements in this section merely provide background information related to the present disclosure and may not constitute prior art.

A digital camera can be employed to identify objects in a field of view. Known methods for detecting and identifying a randomly oriented object in a field of view of a digital camera can take an extended period of time. Relatively slow response times lessen the efficacy and hence the desirability of mounting a digital camera on an end-effector of a robotic arm.

SUMMARY

A method for classifying a known object in a field of view of a digital camera includes developing a plurality of classifier feature vectors, each classifier feature vector is associated with one of a plurality of facet viewing angles of the known object. The digital camera captures an image in a field of view including the known object and an image feature vector is generated based upon said captured image. The image feature vector is compared with each of the plurality of classifier feature vectors and one of the plurality of classifier feature vectors that most closely corresponds to the image feature vector is selected. A pose of the known object relative to the digital camera is determined based upon the selected classifier feature vector.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 1 schematically illustrates a vision system for capturing, processing and storing a two-dimensional (2D) image of a 2D field of view (FOV), including a camera, a known object, and an image classifier, in accordance with the disclosure;

FIG. 2 schematically illustrates a three-dimensional (3D) image of one embodiment of an image classifier including a plurality of facets in accordance with the disclosure;

DETAILED DESCRIPTION

Figure 3:
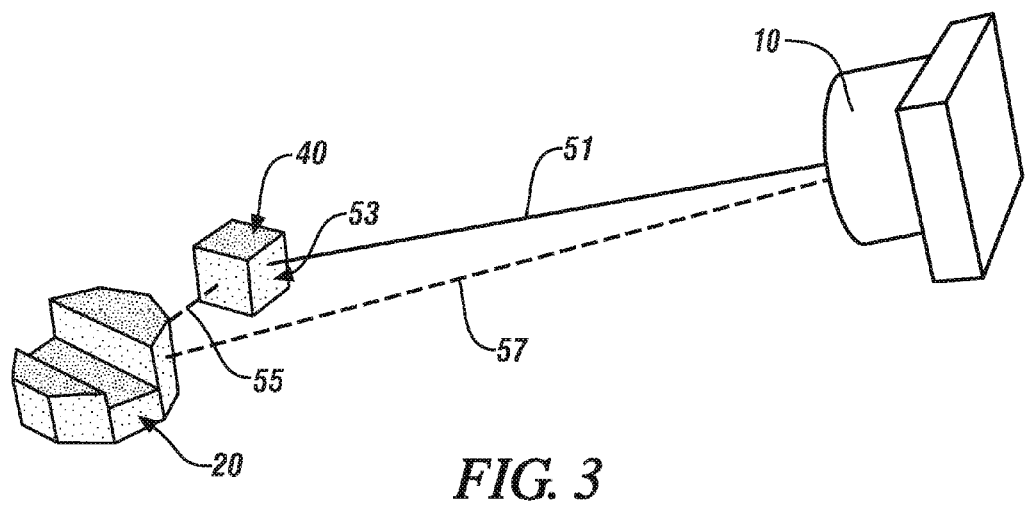
FIG. 3 schematically illustrates an embodiment of the vision system for capturing, processing and storing a two-dimensional (2D) image of a field of view (FOV), including an image detector, a known object, an image classifier and a pose-artifact, in accordance with the disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Like numerals refer to like elements throughout the specification.

Referring now to the drawings, wherein the depictions are for the purpose of illustrating certain exemplary embodiments only and not for the purpose of limiting the same, FIG. 1 schematically illustrates an exemplary vision system for capturing, processing and storing a two-dimensional (2D) image of a field of view (FOV), including an image detector (camera) 10 signally connected to a controller 50, a known object 20, and an image classifier 30. The camera 10 has an orientation 19 about an axis 13, and a physical relationship between the camera 10 and the known object 20 is characterized in terms of a range 17 and a viewing angle. The camera 10 can be at any position and orientation relative to the known object 20.

In one embodiment, the 2D image is a bitmap image file 15 of the field of view shown graphically and in the form of an 8-bit grayscale representation of the FOV, which is a non-limiting embodiment of the FOV. Other embodiments can include a 2D image depicting a color representation of the 2D FOV, a 3D image of a 3D FOV, and other image representations, without limitation. The camera 10 includes an image acquisition sensor that signally connects to an encoder that executes digital signal processing (DSP) on the 2D image. The image acquisition sensor captures pixels in the 2D FOV at a predetermined resolution, and the encoder generates a bitmap of the 2D FOV, e.g., an 8-bit bitmap of the pixels representing the 2D FOV that is communicated to a signal processor. The signal processor generates the bitmap image file 15, which is communicated to the controller 50. The bitmap image file 15 is an encoded datafile stored in a non-transitory digital data storage medium in one embodiment. The bitmap image file 15 includes a representation of an image of a multi-dimensional field of view including the known object 20 that represents an original image of the FOV captured at the original resolution of the camera, e.g., as a datafile that includes an 8-bit grayscale representation of the 2D FOV in one embodiment.

Controller, control module, module, control, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality, including data storage and data analysis. Software, firmware, programs, instructions, routines, code, algorithms and similar terms mean any controller-executable instruction sets including calibrations and look-up tables.

The known object 20 is a known three-dimensional device having pre-defined features including, by way of example, spatial dimensions, materials and surface finishes indicating reflectivity, among others. The image classifier 30 is an analytical tool that is employed in class generation for evaluating an image in the form of the bitmap image file 15 generated by the camera 10 as described herein, and is not a physical component of the vision system.

A 2D image in the form of the bitmap image file 15 of the known object 20 captured by the camera 10 contains sufficient information to evaluate the position of the known object 20 in relation to the camera 10. The shape of the known object 20 depends upon the relative viewing angles and distance between the camera 10 and the known object 20 after influences associated with illumination and reflectivity have been accounted for and the camera 10 has been calibrated. The shape of the known object 20 can be described using the image classifier 30.

The position of the known object 20 in relation to the camera 10 can be described in terms of a vector equation that takes into account orientation and range of the known object 20 that is captured by the camera 10 in the bitmap image file 15. As such, an image that is captured for the known object 20 is described in terms of its longitude, latitude, orientation and range relative to the camera, i.e., Image=F1(Longitude, Latitude, Orientation, Range). This relationship has four variables, three rotations and one range. The quantity of variables in the vector can be reduced by accounting for the range and the orientation of the known object 20 in relation to the camera 10. The bitmap image file 15 includes a contour, which is a portion of the bitmap image file 15 that contains information that represents the known object 20. The range can be accounted for by normalizing or otherwise scaling the size of the contour, as described herein in context of a pose-artifact shown with reference to FIGS. 3 and 4. The orientation can be accounted for by knowing the angle of the camera 10 on its axis and employing rotation-independent features to characterize the contour. Thus, the position of the known object 20 in relation to the camera 10 can be described in terms of the viewing angles of longitude and latitude when such constraints are introduced, i.e., Image=F2(Longitude, Latitude). As such, the image that captures the known object at a known position can be represented as a vector that includes an object, e.g., the bitmap image file that is described in context of a longitude and a latitude.

As described herein, mathematical classifiers are employed to extract the effect of the viewing angle on the bitmap image file and the contour and evaluate the corresponding values of these viewing angles. A mathematical classifier is an analytic process that classifies an observation, e.g., the bitmap image file. A mathematical classifier is a general-purpose classifier that permits complex non-linear characterization in a stochastic situation where it may be difficult to establish behavior, but where training can be employed to specialize their use to a specific task, such as identifying an object. The mathematical classifier receives a feature vector as input and issues a class as output. Class generation includes defining classes, which can be one dimensional, i.e., A, B, C or D. The defined classes identify possible values returned by the classifier. When the observation is a bitmap image file generated by the camera, each bit is assigned to one of the classes. The feature vector is an n-dimensional vector of numerical values that represent an object, including feature values that correspond to the pixels of the image represented by the bitmap image file.

Applying a mathematical classifier to a specific task includes selecting classes, determining what needs to be identified and determining the feature vector in terms of characteristics of the element being classified. The constant in using a classifier is the generation of the feature vector. It is present in all the classifier stages of training, testing, and use. For the viewing angles evaluation, the feature vector is generated from a contour selected in the image, which is represented by the bitmap image file in one embodiment. A feature vector is the input data to the mathematical classifier and is the only data the classifier uses in the classification task.

FIG. 2 schematically shows a three-dimensional (3D) image of one embodiment of the image classifier 100, including a plurality of facets 140 that are individually described herein. As shown, the image classifier 100 includes 26 facets, 12 of which are shown. Each of the facets 140 is characterized by an associated facet viewing angle in terms of a longitude and a latitude, and corresponds to a unique class. Longitudinal and latitudinal gaps 160 are inserted between the facets 140 to effect statistical separation. As shown, the different classes represent the viewing angles. The gaps 160 inserted between the facets 140 improves training quality by providing clear distinction between classes, thus assisting the mathematical classifier to differentiate between the classes. As shown, the facets include viewing angles of longitude and latitude as follows in Table 1.

TABLE 1

| Facet | Latitude (degrees) | Longitude (degrees) |
|---|---|---|
| 141 | 135 | 315 |
| 142 | 135 | 0 |
| 143 | 135 | 45 |
| 144 | 135 | 90 |
| 145 | 90 | 315 |
| 146 | 90 | 0 |
| 147 | 90 | 45 |
| 148 | 90 | 90 |
| 149 | 45 | 0 |
| 150 | 45 | 45 |
| 151 | — | — |

A mathematical classifier can handle only one dimension in its classes, and thus each longitude-latitude pair is used to form a class. As shown, the classes correspond to facets that cover 45-degree angle range on longitude and on latitude. Thus, there are three breaks for latitude, eight breaks for longitude, and a top and a bottom portion for a total of 26 facets and corresponding 26 classes. Determining a class in an image can be done by user input or automatically. An automatic process is preferred to achieve a systematic determination of the viewing angles, which can be accomplished employing a pose-artifact as described with reference to FIGS. 3 and 4. With the viewing angles known, the corresponding class name can be assigned for future use.

Feature vector generation preferably includes identifying feature vector elements that are rotation- and distance-independent between the object and the camera. To achieve this, no orientation-based feature is used and all length and surfaces are normalized to the contour area, preferably ignoring any holes. The feature vector requirements depend on the type of classifier, which is a multi-layer perceptron (MLP) classifier that can be developed based on neural networks technology in one embodiment. This type of classifier accepts large feature vectors, which can be in the order of magnitude of 500+ real values in one embodiment. To increase the performance of the classifier in accurately recognizing classes, it is usually necessary to adapt the computation of the feature vector to the known object being evaluated.

FIG. 3 schematically illustrates an embodiment of the vision system for capturing, processing and storing a two-dimensional (2D) image of a field of view (FOV), and is associated with training and testing described with reference to a known object classification routine 500 described with reference to FIG. 5. The vision system includes embodiments of the image detector (camera) 10, the known object 20 and a pose-artifact 40, which is depicted herein as a pose-cube 40. The pose-cube 40 is fixedly coupled to the known object 20 at a known relative position. The pose-cube 40 gives a spatial reference in the image, including indicating its spatial relationship with the known object 20. Spatial relationships are shown, and include a camera-to-cube face pose 51, a cube face-to-cube transformation 53, a cube-to-known object transformation 55 and a camera-to-object pose 57. When the spatial relationship between the pose-cube 40 and the known object 20 is known, the relative pose of the known object 20 to the camera 10 can be systematically evaluated over a range of positions of the known object 20 using the image classifier 30. Thus, the pose-cube 40 provides a reference point in the evaluation of the relative pose between the known object 20 and the camera 10. From an image processing standpoint, software libraries provide tools to evaluate relative pose of some basic shapes and elements, e.g., calibration plates, circles and rectangles. It is convenient to use one or more of these to measure the relative pose without having to deal with its complex mathematical computation. All these elements are easy to integrate in their planar representation. The pose-cube 40 is a 3D cube-shaped device having six faces, with each face having a unique design. A volume shape is preferably employed to train the image classifier 30 because a single planar element limits the pose range where a pose can actually be evaluated. One convenient volume shape to fabricate is a cube, with planar and rectangular faces that are well suited to precision printing. The design of each face of the pose-cube 40 includes an identifier element and an orientation element that preferably includes a scaled element.

The pose-cube 40 or another pose-artifact can be in the form of a physical device that is employed in a training session. Alternatively, the pose-cube can be configured as a synthetic image employed in a computer-aided design (CAD) environment employing a 3D solid model to generate a surface. The CAD environment can be employed to generate surfaces of the known object 20 in conjunction with the pose-cube 40 in various poses to automate teaching classifying the known object 20 at a plurality of facets wherein a feature vector classifier evaluates the elements of the 3D surfaced model of the known object 20 in the same way that it would evaluate a real image taken of the known object 20. In this way, hundreds of CAD images can be evaluated by the system for teaching the system with the correct pose artifact automatically placed in each image based on formulas related to the origins and scale of the known object 20 in the view. Alternatively, a robot with a carried camera operates as a platform to capture hundreds of images as the camera and robot move incrementally around the known object 20 at various facets. The automated robot teach setup may be the same system that is guided by the system, or, alternatively, a general setup that is used to teach all kinds of known objects.

Figure 4:
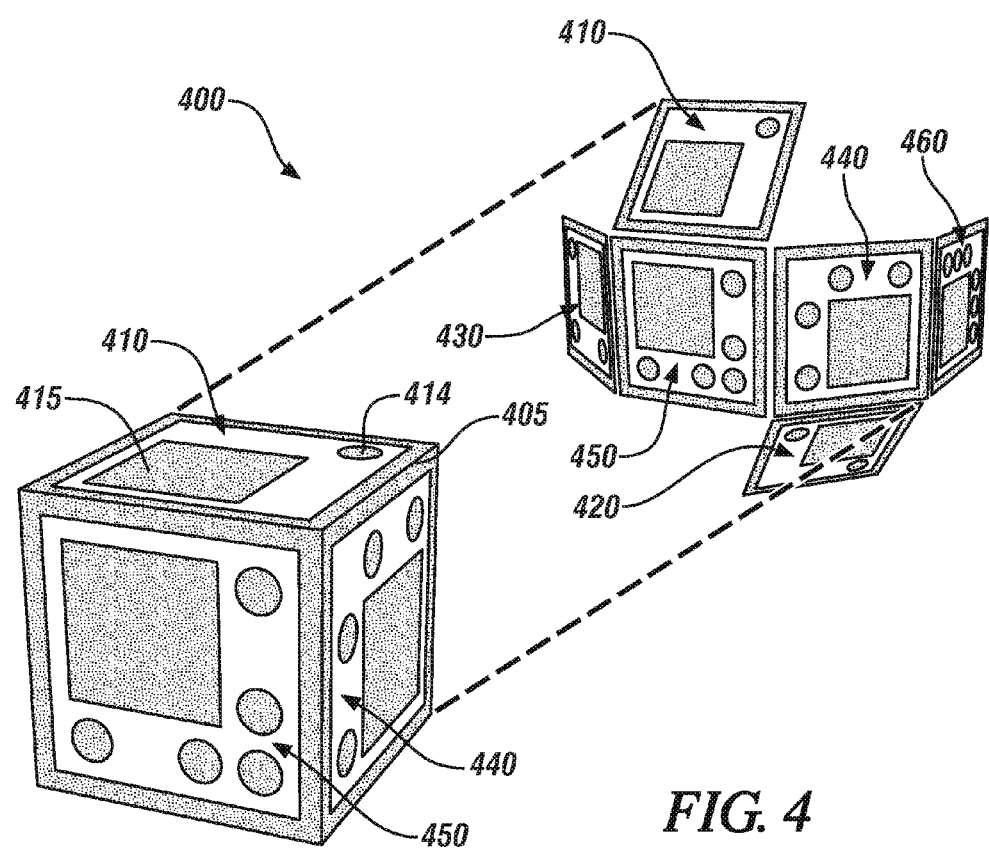
FIG. 4 schematically shows one embodiment of a pose-cube including an isometric view of the pose-cube and an exploded view that shows all six faces of the pose-cube including the three faces, in accordance with the disclosure.

FIG. 4 schematically shows one embodiment of a pose-cube 400 including an isometric view of the pose-cube 400 and a corresponding exploded view of the pose-cube 400. The isometric view of the pose-cube 400 includes three of the faces 410, 440 and 450. The exploded view shows all six faces of the pose-cube including the three faces 410, 440 and 450 and three additional faces 420, 430 and 460. Designations of the faces as first, second, etc. is employed for ease of description. Each of the faces includes a blank background with printing including identifier elements in the form of a unique quantity of circular black dots 414 and a scaled orientation element in the form of a black square 415 of known dimension. The identifier elements in the form of a unique quantity of circular black dots 414 and the scaled orientation element in the form of a black square 415 of known dimension are uniquely located on the associated face so as to identify orientation of the face as one of right-side up, laying on a left side, laying on a right side and upside-down. First face 410 includes a blank background having identifier elements in the form of a single circular black dot and a scaled orientation element in the form of a black square of known dimension located on a lower left-hand corner as shown. Second face 420 includes a blank background having identifier elements in the form of two circular black dots and a scaled orientation element in the form of a black square located on an upper right-hand corner as shown. Third face 430 includes a blank background having identifier elements in the form of three circular black dots and a scaled orientation element in the form of a black square located on an upper right-hand corner as shown. Fourth face 440 includes a blank background having identifier elements in the form of three circular black dots and a scaled orientation element in the form of a black square located on a lower right-hand corner as shown. Fifth face 450 includes a blank background having identifier elements in the form of five circular black dots and a scaled orientation element in the form of a black square located on an upper left-hand corner. Sixth face 460 includes a blank background having identifier elements in the form of six circular black dots and a scaled orientation element in the form of a black square located on a lower left-hand corner. Gaps 405 are formed between each of the contiguous faces. The pose-cube 400 is illustrative of one embodiment. Other embodiments of pose-cubes employing different identifier elements and/or different scaled orientation elements may be effectively employed. Furthermore, other embodiments employing other colors on the visible spectrum may be may be effectively employed. Furthermore, other embodiments employing other configurations, such as quick-response (QR) codes or bar codes, or variations thereon may be effectively employed.

Referring again to FIG. 3, the combination of the identifier elements and the scaled orientation elements of the pose-cube 40 facilitates identifying, orienting and scaling the pose-cube 40 in the FOV with the image classifier 30 during training and testing. This includes identifying one of the faces of the pose-cube 40 based upon the identifier elements, and determining the orientation of the pose-cube 40 based upon the location of the scaled orientation element and determining the scaling and distance between the pose-cube 40 and the camera. The spatial relationship between the pose-cube 40 and the known object 20 in combination with the shape of the known object 20 facilitates identifying, orienting and scaling the known object.

When a pose of the pose-cube 40 is known, the pose of the known object 20 can be readily evaluated using the spatial relationship between the pose-cube 40 and the known object 20. The pose of the known object 20 is determined by capturing an image of the pose-cube 40 and the known object 20 in the form of a bitmap image file, and evaluating the portion of the bitmap image file including the pose-cube 40 and the known object 20, i.e., the contour in context of the relationship between the identified one of the faces of the pose-cube 40 and the orientation of the known object 20 based upon the relationship between the orientation of the pose-cube 40 and the known object 20. The evaluation process includes evaluating a pose of one of the faces of the pose-cube relative to the camera, which can be determined based upon a transformation of the identified face of the pose-cube 40 relative to the known object 20 to determine orientation, and determining the pose of the known object 20 based upon the orientation of the pose-cube 40.

Figure 5:
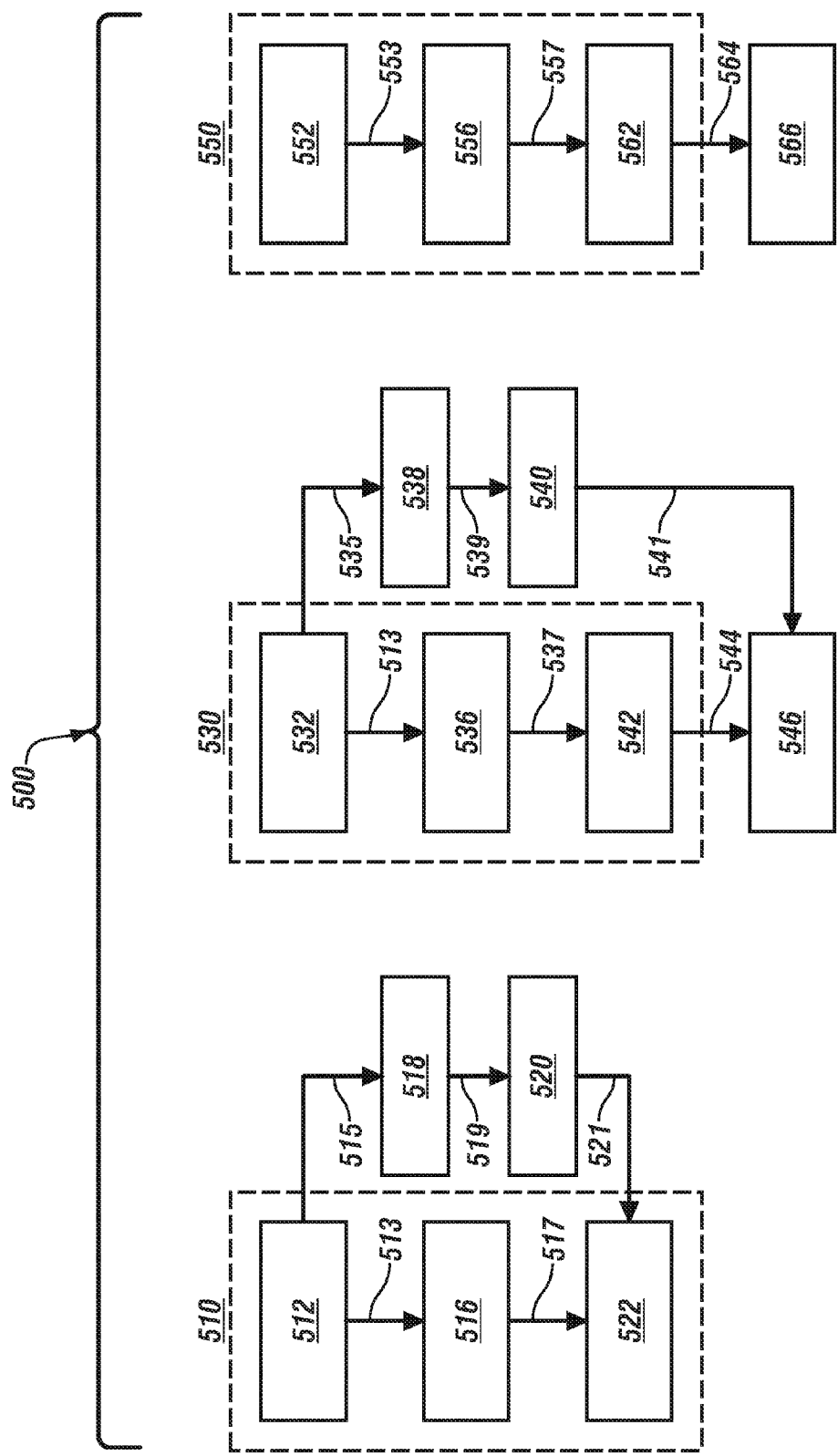
FIG. 5 is a known object classification routine, in accordance with the disclosure.

FIG. 5 schematically shows a known object classification routine 500 that includes training, testing and executing a process for classifying a known object in a field of view of a digital camera, employing an embodiment of the system described hereinabove. Table 2 is provided as a key wherein the numerically labeled blocks and the corresponding functions are set forth as follows, corresponding to the known object classification routine 500.

TABLE 2

| BLOCK | BLOCK CONTENTS |
| --- | --- |
| 510 | Training |
| 512 | Capture image including known object and pose-cube |
| 513 | Identify contour |
| 515 | Identify pose-cube |
| 516 | Compute features of contour |
| 517 | Determine feature vector |
| 518 | Read angles of pose-cube |
| 519 | Determine view angles |
| 520 | Transform view angles to measured class |
| 522 | Execute classifier - correlate feature vector and measured class |
| 530 | Testing |
| 532 | Capture image including known object and pose-cube |
| 533 | Identify contour |
| 535 | Identify pose-cube |
| 536 | Compute features of contour |
| 537 | Determine feature vector |
| 538 | Read angles of pose-cube |
| 539 | Determine view angles |
| 540 | Transform view angles to measured class |
| 542 | Execute classifier to estimate class from feature vector |
| 546 | Test - compare estimated class and measured class |
| 550 | In-Use |
| 552 | Capture image including known object |
| 553 | Identify contour |
| 556 | Compute features of contour |
| 557 | Determine feature vector from contour |
| 562 | Execute classifier to estimate class |
| 566 | Identify a range and a pose of the known object based upon the class |

The known object classification routine 500 operates as follows, and includes training 510, testing 530 and in-use operation 550. Training 510 is executed prior to deployment of the known object classification routine 500 or as part of continuous improvement during deploying. Training 510 provides a quantity of known samples in the form of couples formed by a feature vector and a class to permit class identification over the range of variation of each class. With this data, the classifier models the relationships between feature vector elements and classes. At the end of the training, the classifier identifies and returns the class it determines the best suited for a specific value of the feature vector. Training 510 includes employing a camera to capture an image in the form of a bitmap image file that includes a known object and a pose-cube (512). A contour in the image is identified (513) and the pose-cube is identified, which includes identifying a specific face of the pose-cube and determining an orientation of the pose-cube (515). A feature computation is executed on the contour of the image (516) to determine a feature vector (517), which is provided to a classifier. Angles of the pose-cube are read (518) to determine a viewing angle thereof (519), and the viewing angle is transformed to a specific class 521 (520). The specific class 521 is provided to the classifier (522), which correlates the feature vector and the measured class. In this manner, the training 510 develops a plurality of classifier feature vectors, wherein each classifier feature vector corresponds to a contour of the captured image including the viewing angle of the known object in relation to the camera. During the teaching of the system, there is enough information to interpolate between range and pose angle classes when the feature vectors are evaluated. This also give a rough estimate of the distance and orientation of the known object in the FOV. This information may be sufficient in itself to provide guidance to a robotic device to grasp the known object, given the approximate nature of a general purpose grasper device.

Testing 530 also occurs prior to deployment and implementation (530), and includes employing the camera to capture an image in the form of a bitmap image file that includes the known object and the pose-cube (532). A contour in the image is identified (533) and the pose-cube is identified (535). A feature computation is executed on the contour of the image (536) to determine a feature vector (537), which is provided to a classifier (542). Angles of the pose-cube are read (538) to determine a viewing angle thereof (539), and the viewing angle is transformed to a specific class (540). The classifier (542) estimates a specific class 544 based upon the training, and the estimated specific class 544 is compared with the specific class to verify the result (546).

The basis for the testing segment 530 involves verifying the characterization of mathematical classifiers. A basic verification process includes testing the classifier (542) with the training set to ensure the feature vector can actually separate the classes. This test is intended to show that the known class is identical to the estimated class for 100% of the training samples. Otherwise, additional training and development is required to improve the feature vector separation between the classes. When the training set verification is successful, the classifier is then tested with a known sample set not used during training. This indicates the classifier's ability to classify. Ideally this is 100% but may be less depending on the complexity of the classification.

The known object classification routine 500 is deployed in-use (550) to determine a range and a pose of a known object relative to the digital camera. This includes employing the camera to capture an image in the form of a bitmap image file that includes the known object (552). A contour in the image is identified (553) and a feature computation is executed on the contour of the image (556) to determine an image feature vector (557), which is provided to a classifier (562). The classifier step (562) compares the image feature vector with each of the plurality of classifier feature vectors developed during the training and testing portions (Steps 510 through 546) and selects one of the plurality of classifier feature vectors (564) that most closely corresponds to the image feature vector. This includes employing statistical analysis techniques to estimate or otherwise select a specific one of the classifier feature vectors as corresponding to the image feature vector based upon the training. The selected classifier feature vector (564) can be employed to determine a range and a pose of the known object relative to the digital camera (566).

The use of the classifier (562) online includes generating the feature vector and evaluating the feature vector with the classifier. In terms of processing time, the feature vector generation takes the longest time to execute. In one embodiment, generating a feature vector can take 10 ms, and less than 1 ms when evaluated on a dual-core 2.8 GHz processor.

The evaluation of the viewing angle to a known object reaches a success rate of 95% using a MLP (mathematical classifier) with 26 classes. Its strength is its processing speed that allows dynamic deployment in real-time. Training is achievable with the pose-cube to automate the process of determining actual viewing angles for use with the training samples.

The system permits a rapid evaluation of relative orientation of a known object to select an appropriate method of interaction between an end-effector and a known object, including enabling rapid estimation of the relative orientation and distance (from scale) of known objects with respect to the camera system obtaining an image of the scene of interest. Furthermore, employing a 3D pose artifact in the scene with the object facilitates teaching the system about specific objects.

The system facilitates an initial rough estimation of an object's pose with respect to camera, employs a fast, low cost 2D image to estimate 6 degrees-of-freedom (DOF) for known object. The teaching can include using a pose-cube located near the known object in image to teach, with pose reference techniques for the pose-cube being used with synthetic images from seed files originating in a computer-aided design (CAD) environment. In-use, the system allows a fast estimate that can be used as is, or to "seed" and accelerate a more accurate technique. Such operation increases the speed and flexibility of robot guidance capability as a process enabler and decreases complexity of robot guidance applications by using simple 2D sensors and lighting.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for classifying a known object in a field of view of a digital camera, the method comprising:
  developing a plurality of classifier feature vectors, each classifier feature vector associated with one of a plurality of facet viewing angles of the known object, wherein developing the plurality of classifier feature vectors comprises:
    fixedly coupling a pose-artifact to the known object at a known spatial relationship, and
    for each of the facet viewing angles:
      generating an image that includes the known object and the pose-artifact,
      identifying the known object and the pose-artifact in the image,
      determining a feature vector of the known object,
      determining a viewing angle of the pose-artifact,
      transforming the viewing angle of the pose-artifact to a specific one of a plurality of classes associated with the facet viewing angle, and
      correlating the feature vector of the known object to the specific one of the plurality of classes associated with the facet viewing angle;
  capturing, using the digital camera, an image in a field of view including the known object;
  generating an image feature vector based upon said captured image;
  comparing the image feature vector with each of the plurality of classifier feature vectors and selecting one of the plurality of classifier feature vectors that most closely corresponds to the image feature vector; and
  determining a pose of the known object relative to the digital camera based upon the selected classifier feature vector.

2. The method of claim 1, wherein generating an image that includes the known object and the pose-artifact comprises employing a computer-aided design environment to generate a synthetic image employing a 3D solid model of the known object and the pose-artifact.

3. The method of claim 1, wherein generating an image that includes the known object and the pose-artifact comprises employing the digital camera to capture an image in the form of a bitmap image file that includes the known object and the pose-artifact.

4. The method of claim 1, wherein the pose-artifact comprises a pose-cube; and wherein determining a viewing angle of the pose-artifact comprises identifying one of a plurality of faces of the pose-cube and determining an orientation of the pose-cube.

5. The method of claim 4, wherein the pose-cube comprises six faces, and wherein each of the faces includes a unique identifier element and a uniquely located scaled orientation element.

6. The method of claim 1, further comprising determining a range and the pose of the known object relative to the digital camera based upon the selected classifier feature vector.

7. The method of claim 1, wherein capturing, using the digital camera, an image in a field of view including the known object comprises capturing a two-dimensional (2D) image of the known object.

8. The method of claim 7, wherein capturing the 2D image of the known object comprises capturing a bitmap image file in the form of an 8-bit grayscale representation of the field of view including the known object.

9. A method for classifying a known object in a field of view of a digital camera, the method comprising:
  developing a plurality of classifier feature vectors, each classifier feature vector associated with one of a plurality of facet viewing angles of the known object;
  capturing, using the digital camera, an image in a field of view including the known object
  generating an image feature vector based upon said captured image;
  comparing the image feature vector with each of the plurality of classifier feature vectors and selecting one of the plurality of classifier feature vectors that most closely corresponds to the image feature vector; and
  determining a pose of the known object relative to the digital camera based upon the selected classifier feature vector;
  wherein developing the plurality of classifier feature vectors comprises:
  for each of the facet viewing angles:
    generating an image including the known object and a pose-artifact arranged in spatial relationship to the known object;

identifying the known object and the pose-artifact in the image;
determining a feature vector of the known object;
determining a viewing angle of the pose-artifact;
transforming the viewing angle of the pose-artifact to a specific one of a plurality of classes associated with the facet viewing angle; and
correlating the feature vector of the known object to the specific one of the plurality of classes associated with the facet viewing angle.

10. The method of claim 9, wherein identifying the known object and the pose-artifact in the image comprises identifying a contour of the known object and the pose-artifact in the image, and wherein determining a feature vector of the known object comprises determining a feature vector of the contour of the known object.

11. The method of claim 9, wherein generating an image including the known object and a pose-artifact arranged in spatial relationship to the known object comprises capturing, using the digital camera, an image in a field of view including the known object and the pose-artifact.

12. The method of claim 9, wherein generating an image including the known object and a pose-artifact arranged in spatial relationship to the known object comprises generating an image including the known object and the pose-artifact arranged in spatial relationship to the known object in a computer-aided design (CAD) environment employing a 3D solid model.

13. A method for classifying a known object in a field of view of a digital camera, said known object comprising a three-dimensional (3D) device having pre-defined features including spatial dimensions, the method comprising:
developing a plurality of classifier feature vectors, each classifier feature vector associated with one of a plurality of facet viewing angles of the known object;
capturing, using the digital camera, a bitmap image file of a field of view including the known object;
generating an image feature vector based upon said captured bitmap image file;
comparing the image feature vector with the plurality of classifier feature vectors;
selecting one of the plurality of classifier feature vectors that most closely corresponds to the image feature vector; and
determining a pose of the known object relative to the digital camera based upon the facet viewing angle of the known object associated with the selected classifier feature vector;
wherein developing the plurality of classifier feature vectors comprises:
fixedly coupling a pose-artifact to the known object at a known spatial relationship; and
for each of the facet viewing angles:
generating an image that includes the known object and the pose-artifact;
identifying the known object and the pose-artifact in the image;
determining a feature vector of the known object;
determining a viewing angle of the pose-artifact;
transforming the viewing angle of the pose-artifact to a specific one of a plurality of classes associated with the facet viewing angle; and
correlating the feature vector of the known object to the specific one of the plurality of classes associated with the facet viewing angle.

14. The method of claim 13, wherein generating an image that includes the known object and the pose-artifact comprises employing a computer-aided design environment to generate a synthetic image employing a 3D solid model of the known object and the pose-artifact.

15. A method for classifying a known object in a field of view of a digital camera, said known object comprising a three-dimensional (3D) device having pre-defined features including spatial dimensions, the method comprising:
developing a plurality of classifier feature vectors, each classifier feature vector associated with one of a plurality of facet viewing angles of the known object;
capturing, using the digital camera, a bitmap image file of a field of view including the known object;
generating an image feature vector based upon said captured bitmap image file;
comparing the image feature vector with the plurality of classifier feature vectors;
selecting one of the plurality of classifier feature vectors that most closely corresponds to the image feature vector; and
determining a pose of the known object relative to the digital camera based upon the facet viewing angle of the known object associated with the selected classifier feature vector;
wherein developing the plurality of classifier feature vectors comprises:
for each of the facet viewing angles:
generating an image including the known object and a pose-artifact arranged in spatial relationship to the known object;
identifying the known object and the pose-artifact in the image;
determining a feature vector of the known object;
determining a viewing angle of the pose-artifact;
transforming the viewing angle of the pose-artifact to a specific one of a plurality of classes associated with the facet viewing angle; and
correlating the feature vector of the known object to the specific one of the plurality of classes associated with the facet viewing angle.

\* \* \* \* \*